Figure 1:
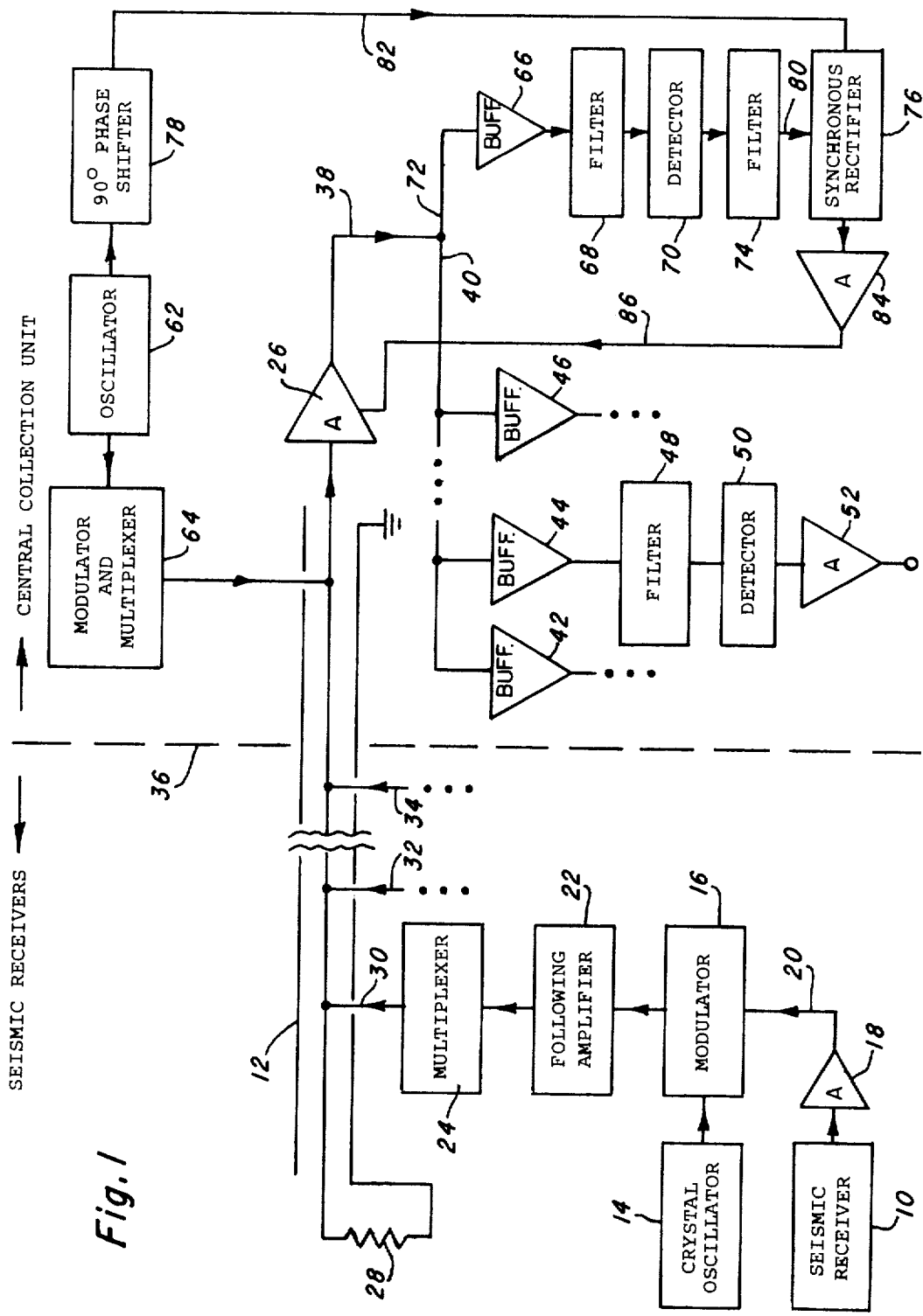

United States Patent [19]

Ezell et al.

[11] 3,988,712

[45] Oct. 26, 1976

[54] MULTIPLEX DATA COMMUNICATION SYSTEM EXPLORATION SURVEYS

[75] Inventors: G. Dale Ezell; George L. Steckmann, both of Dallas, Tex.

[73] Assignee: Texas Instruments Incorporated, Dallas, Tex.

[22] Filed: Nov. 27, 1974

[21] Appl. No.: 527,912

[52] U.S. Cl. ............... 340/15.5 TS; 340/15.5 MC; 330/31; 325/10; 325/52; 325/472
[51] Int. Cl.² ......................................... G01V 1/22
[58] Field of Search ............ 340/15.5 MC, 15.5 TC, 340/15.5 TS, 18 CM, 18 FM, 150, 7; 181/112; 325/2, 3, 10, 52, 62, 65, 472, 480; 179/15 FD, 15 FS; 330/30 R, 31

[56] References Cited
UNITED STATES PATENTS

| | | | |
|---|---|---|---|
| 3,239,803 | 3/1966 | Godbey | 340/18 FM |
| 3,411,088 | 11/1968 | Hutchison | 325/3 |
| 3,487,169 | 12/1969 | Miyagi | 325/62 |
| 3,513,405 | 5/1970 | Carlson | 325/472 |
| 3,689,841 | 9/1972 | Bello et al. | 179/15 FS |
| 3,886,470 | 5/1975 | O'Neil et al. | 330/30 R |
| R23,919 | 1/1955 | Hawkins | 340/15.5 TS |

OTHER PUBLICATIONS

Army Tech. Manual, "Basic Theory and Applications of Transistors," Mar. 1959, pp. 133-137, 146-147.

*Primary Examiner*—Nelson Moskowitz
*Attorney, Agent, or Firm*—Harold Levine; Rene E. Grossman; Leo N. Heiting

[57] ABSTRACT

A cable for electrically connecting a plurality of seismic receivers to a central data collecting unit contains a single electrical channel. The output signal of each seismic receiver is used to modulate a carrier signal having its own distinct frequency. The plurality of modulated carrier signals are frequency division multiplexed onto the single electrical channel and transmitted to the central collecting unit. There, narrowband filters are used to demultiplex the individual modulated carriers so that the signals may then be demodulated to recover the individual seismic receiver signals. A feedback loop is used to bias the amplifier at the central collecting station so as to minimize cross-modulation distortion occurring therein.

25 Claims, 11 Drawing Figures

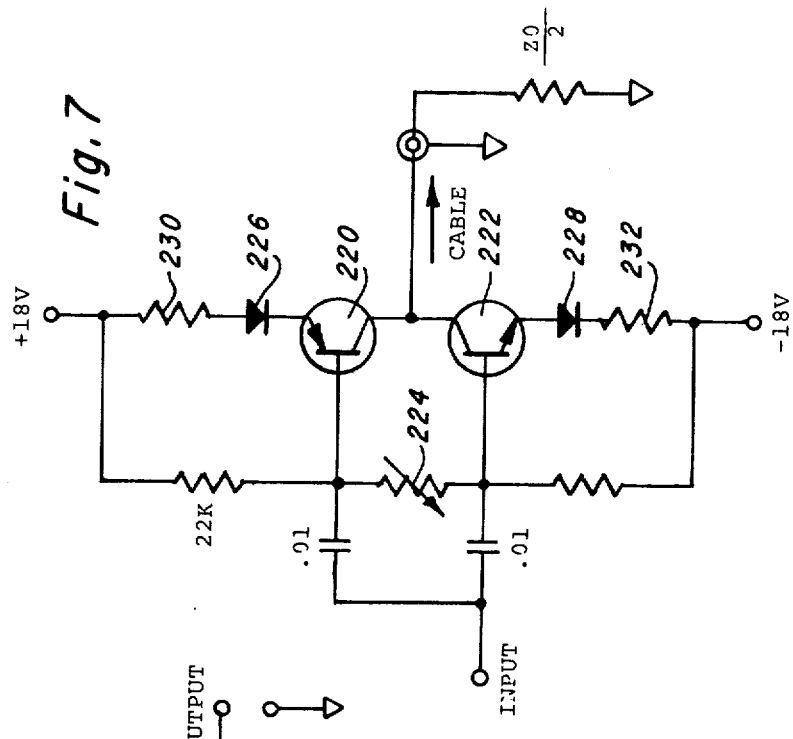
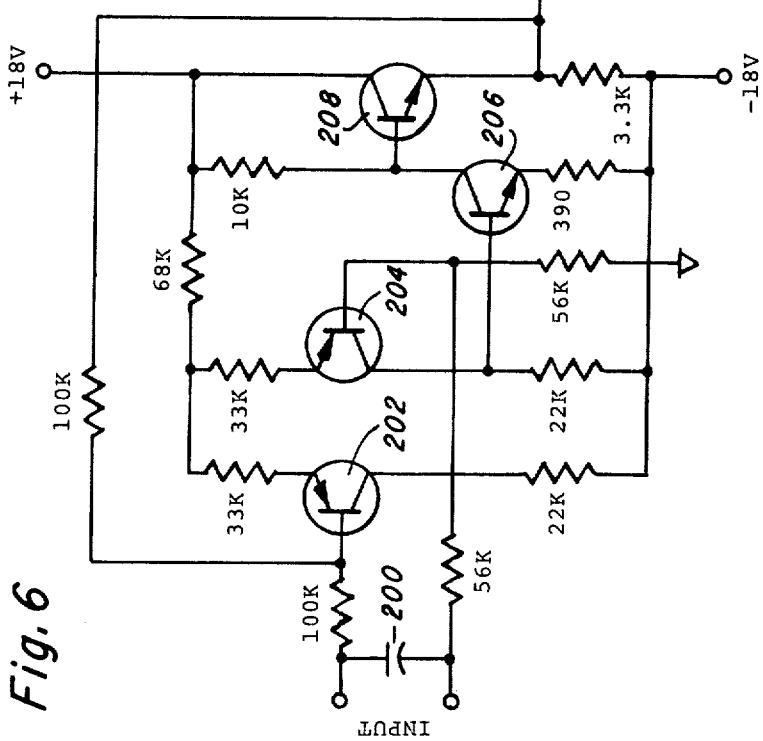

MULTIPLEX DATA COMMUNICATION SYSTEM EXPLORATION SURVEYS

This invention relates to a method and apparatus for frequency division multiplexing of multi-channel information onto a single electrical channel.

It frequently becomes necessary in seismic prospecting to connect the electrical outputs of a plurality of seismic receivers to a central data collecting unit. In a typical prospecting arrangement for example a source of vibrational energy is caused to impart seismic vibrations into the ground. These seismic vibrations radiate in a generally downward direction into the body of the earth. Upon encountering discontinuities which separate various subsurface structural layers, portions of this vibrational energy are reflected back toward the surface of the earth. It is common practice to locate a plurality of seismic receivers over an area or along a line on the surface of the earth. These seismic receivers produce electrical signals representative of the reflected seismic energy impinging on the receivers from below. The signals produced by the receivers contain valuable information about the subsurface structure of the earth and are commonly conveyed to a central collection unit for preprocessing, collation, and recording. The connection between the various seismic receivers and the central data collecting unit is frequently by means of a seismic sensor cable.

In the case of marine exploration, for example, the individual seismic detectors, in this case hydrophones, are located in a seismic streamer which is towed behind a ship. The streamer provides first a mechanical means for maintaining the hydrophones at a desired distance and spacing relative to the ship. Secondly, the streamer provides a housing for the various electrical wires which connect the individual hydrophones to the central data collection unit located aboard the ship.

Similarly, in land exploration, it is common to locate a plurality of seismic receivers, in this case geophones, over an area or along a line on the surface of the earth. Again, the individual geophones are connected by means of a single cable to a central collection unit frequently located in a truck or other vehicle.

In either case, prior art seismic cables have typically included a separate electrical channel corresponding to each of the seismic receivers. In a typical 24 hydrophone marine streamer, for example, the streamer will contain 24 twisted pair wires which carry the signals from the individual hydrophones to the recording instrument on board the ship. Similarly, a typical land seismic cable will contain a twisted pair of wires corresponding to each geophone. It should be noted that for the purposes of this disclosure the terms hydrophone, geophone, and seismic receiver are intended to comprise instrument groups as well as single instruments. As is well known in the art, a group is a closely located plurality of individual instruments the outputs of which are mutually connected in parallel, series, or series/parallel combinations to provide a single electrical output signal. From the standpoint of external connections, therefore, an instrument group may be treated in the same manner as a single instrument.

For various reasons it would be desirable to reduce the number of electrical connectors contained within a seismic cable. This would permit reduction in the diameter of the cable thereby leading to more efficient cable handling and storage. In the case of a marine streamer the reduced diameter would also permit more efficient towing of the cable. In addition, reduction of the number of wires in the cable would result in a more reliable cable.

With the advent of high capacity digital computers and sophisticated techniques for processing seismic data, however, it has also become desirable to increase the number of seismic receivers used in a typical exploration system. In contrast with the above mentioned considerations, therefore, this consideration suggests the desirability of increasing the channel handling capability of a seismic cable.

In copending U.S. Pat. application Ser. No. 527,913 filed Nov. 27, 1974 a system is described and claimed which provides a unique resolution of the conflicting requirements set forth above. The present invention relates to that system but provides a system and method that are superior in several respects. A single transmission line is used in the seismic cable for transmitting the signals from a plurality of seismic receivers back to the central data collection unit. Typically, this transmission line may take the form of a coaxial cable. The output signal from each of the seismic receivers is used to drive a modulator located at the seismic receiver. The various modulated signals are then frequency division multiplexed onto the transmission line. At the central collecting unit the frequency division multiplexed signal appearing on the transmission line is amplified in a wideband amplifier. The amplifier output is demultiplexed by means of a plurality of narrow band filters, the center frequency of each of the filters corresponding to the carrier frequency at one of the seismic receivers. Finally, the various demultiplexed signals are demodulated to recover the individual seismic receiver signals.

In a more specific embodiment of the invention each seismic receiver output signal is used to amplitude modulate a carrier signal having a distinct frequency. The seismic transmission line is terminated at both ends thereof in the characteristic impedance of the line. As a result, the impedance seen looking into the transmission line at any point along its length will be constant and equal to one half the characteristic impedance of the line. At each seismic receiver the amplitude modulated carrier frequency drives an amplifier which has an output impedance much greater than one half the characteristic impedance of the transmission line. Each of these amplifiers is coupled directly into the transmission line. It will be understood by those skilled in the art, therefore, that each amplifier will inject onto the transmission line a current which is directly representative of the amplitude modulated carrier frequency stemming from the corresponding seismic receiver. In this way the various signals are frequency division multiplexed onto the transmission line.

As a result of the non-linearity inherent in practical amplifiers and in view of the plurality of amplitude modulated carrier signals present on the transmission line, there exists the possiblity of cross-modulation distortion in the wideband amplifier located at the central data collection unit. In the preferred embodiment, this wideband amplifier comprises a field effect transistor stage. The transfer function of a field effect transistor (having square law dependence in the theoretical case) is such as to minimize the occurrence of cross-modulation distortion. In addition, there is disclosed a unique feedback loop for establishing the bias on the field effect transistor so as to further minimize the occurrence of cross-modulation distortion.

While the invention is described in the context of a seismic data collection system, it will be apparent to those skilled in the art that the unique method for frequency division multiplexing and for minimizing cross-modulation distortion is also applicable to other types of multichannel data systems.

It is, therefore, an object of the present invention to provide a seismic sensor cable having a reduced diameter.

It is another object of the invention to provide a seismic sensor cable having an increased channel capacity.

It is a further object of the invention to provide a seismic sensor cable having reduced phase distortion.

It is yet another object of the invention to achieve the aforementioned objects by means of a seismic sensor cable wherein the outputs of the various seismic receivers are used to modulate individual carrier signals and the modulated carrier signals are frequency division multiplexed onto a single transmission line in the cable.

It is still a further object of the invention to provide a method and apparatus for frequency division multiplexing modulated carrier signals onto a transmission line by means of individual current summers associated with each of the modulated carrier signals.

It is a further object of the invention to provide a system for amplifying frequency division multiplexed signals while substantially eliminating any attendant cross-modulation distortion.

Figure 3:
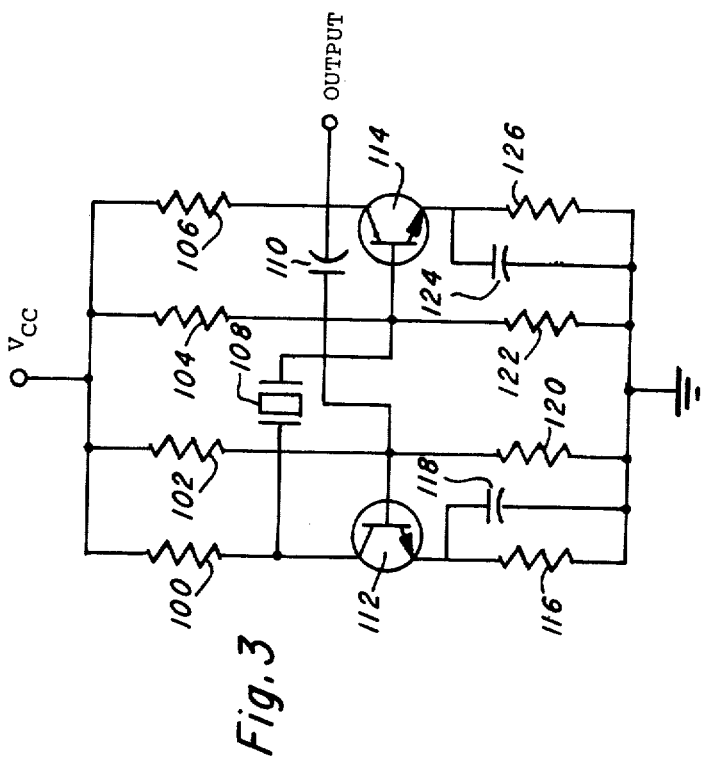
Figure 2:
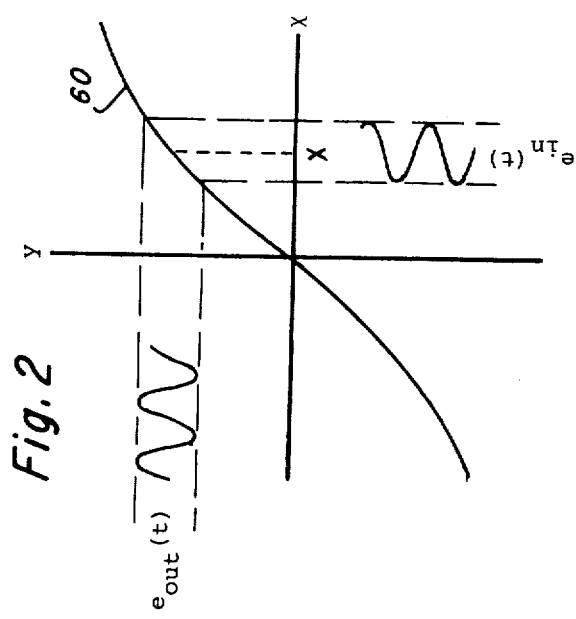
Figure 4:
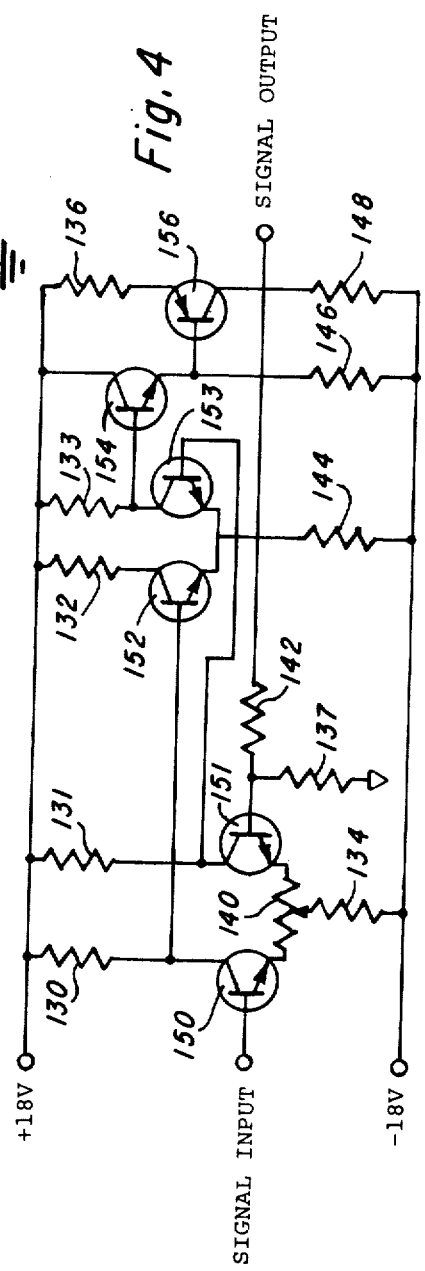
Figure 5:
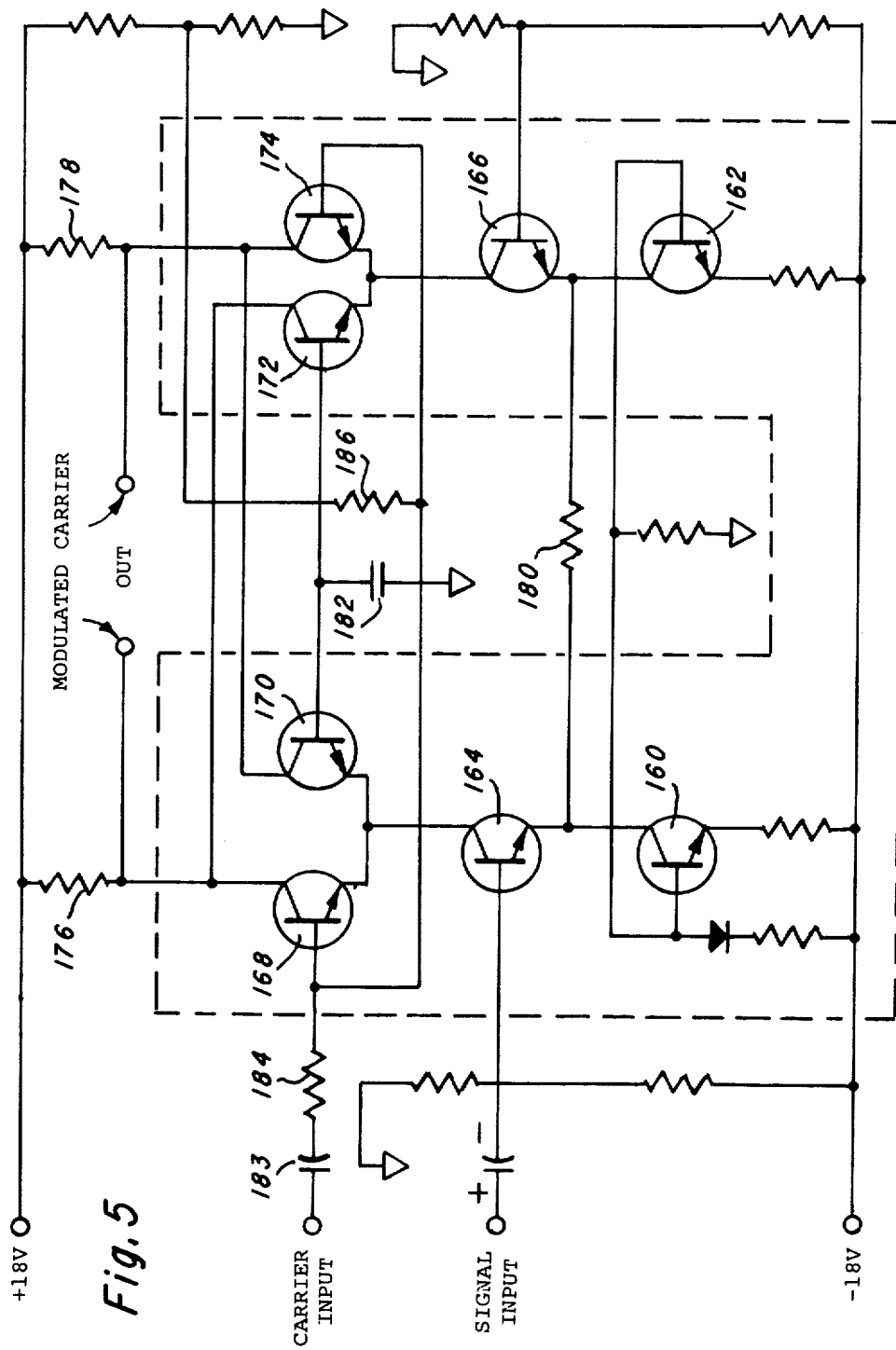
Figure 8:
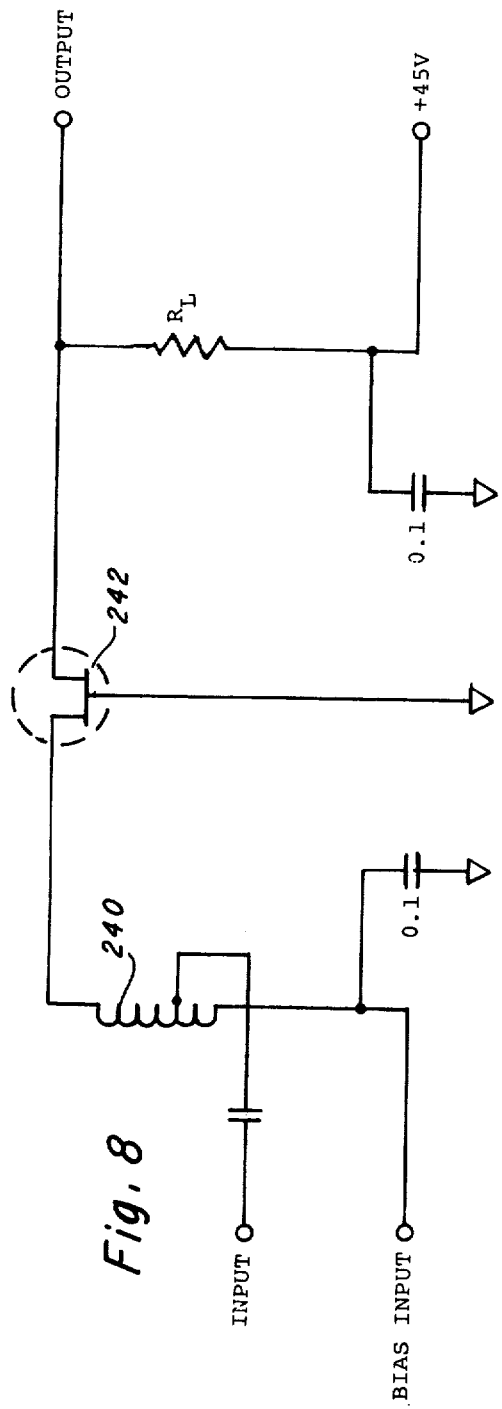
Figure 10:
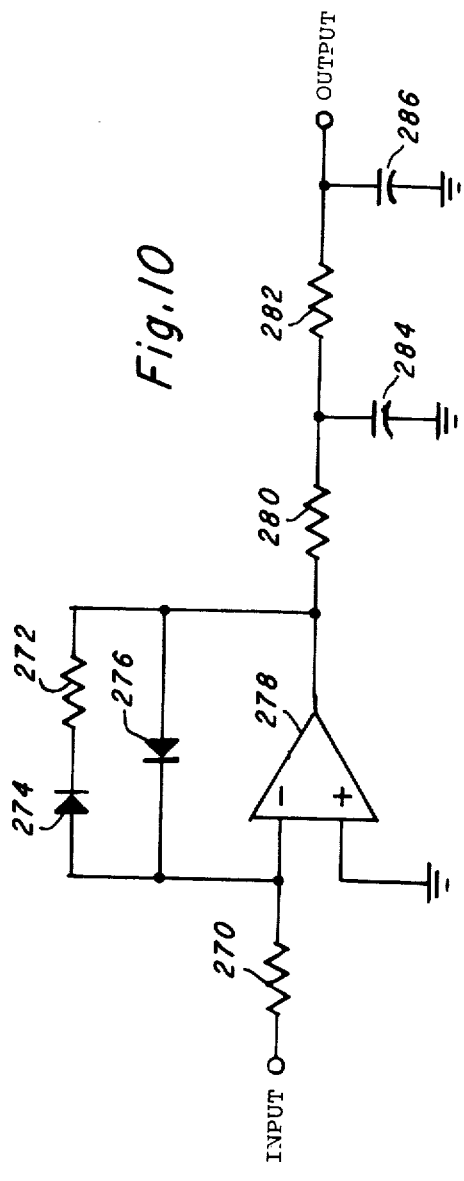
Figure 9:
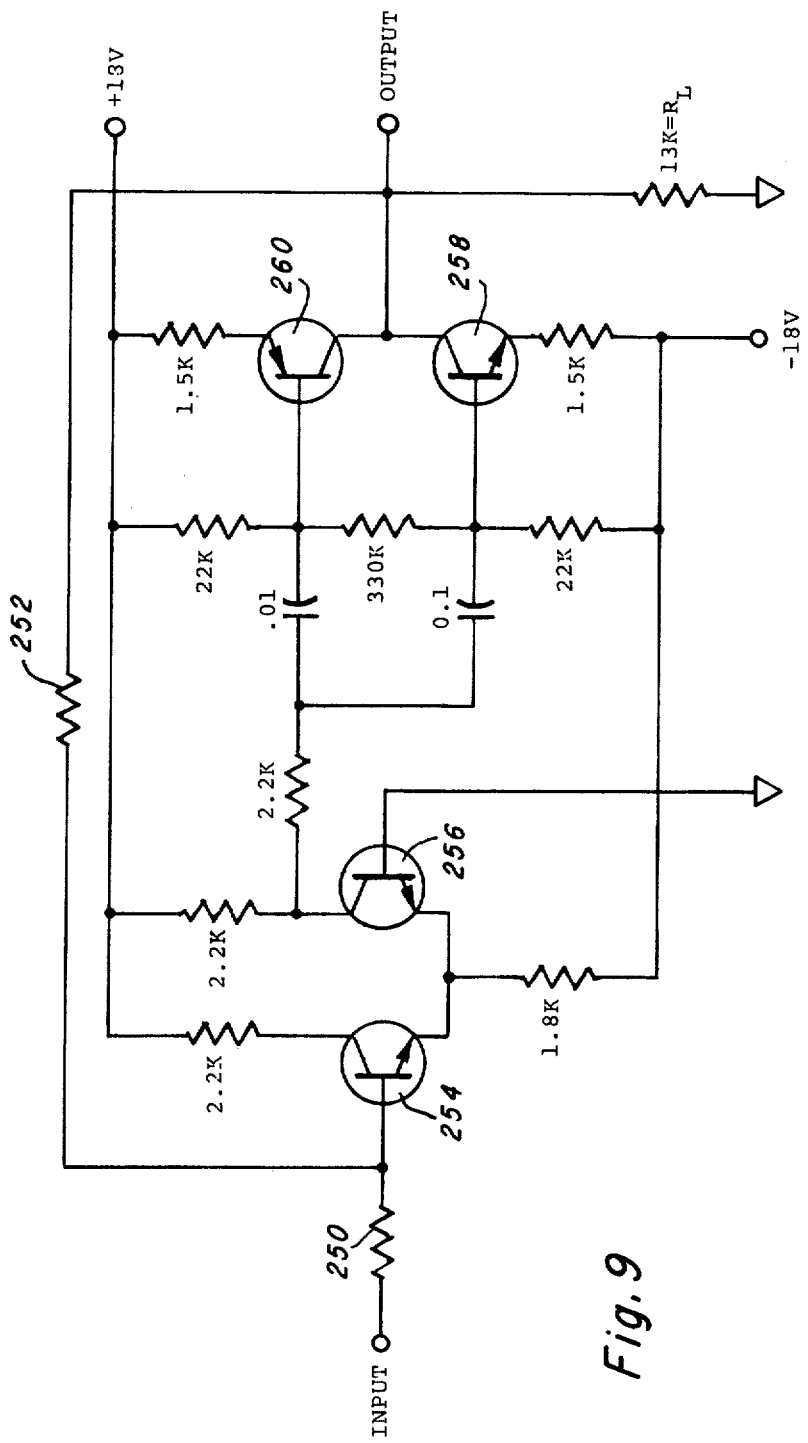
Figure 11:
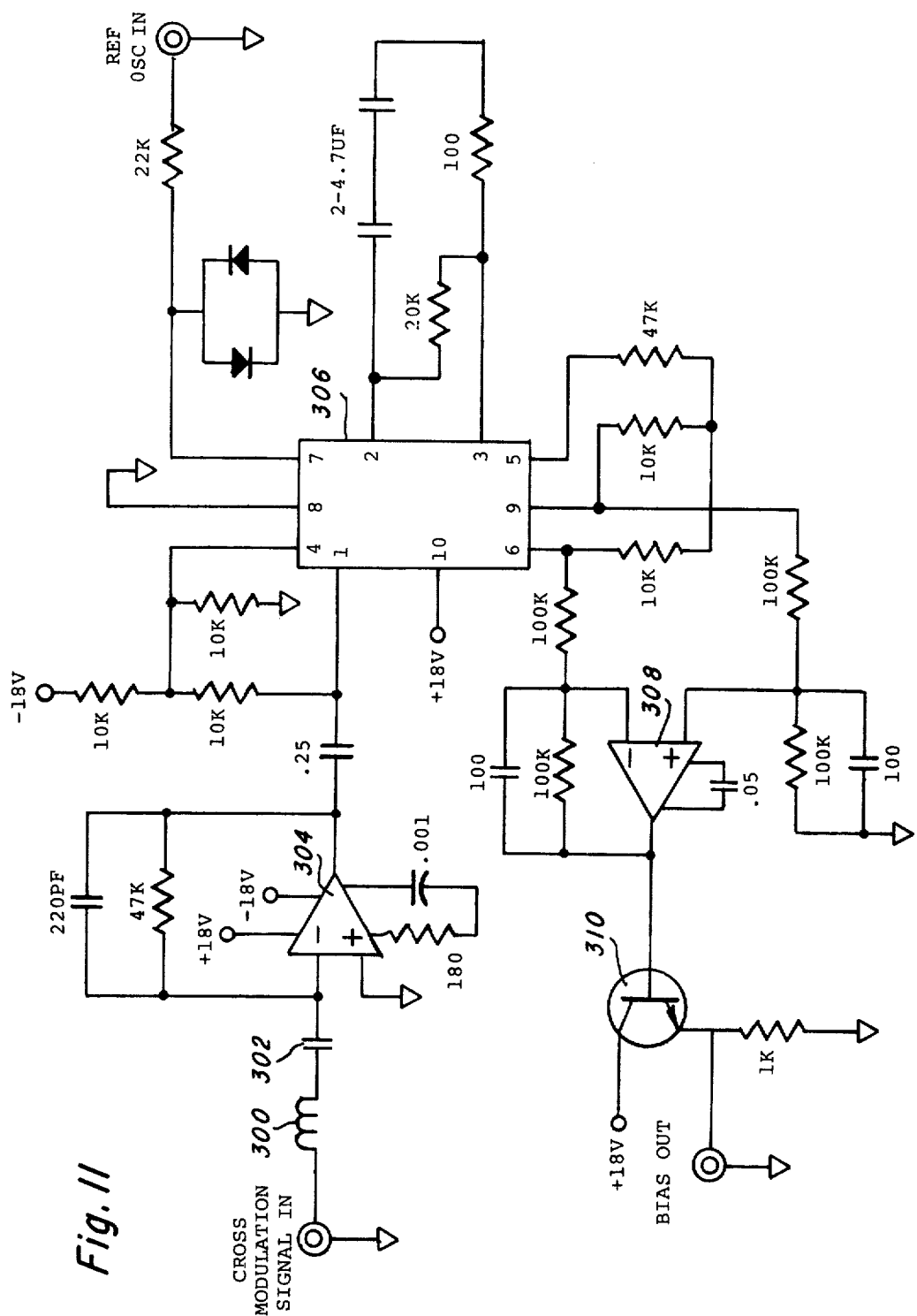

Other objects and features of the invention will become clear by a consideration of the following detailed description in connection with the attached drawings wherein:

FIG. 1 is a system diagram illustrating the invention.
FIG. 2 shows a typical amplifier transfer function.
FIG. 3 is a schematic diagram of the carrier frequency oscillator.
FIG. 4 is a schematic diagram of the input amplifier.
FIG. 5 is a schematic diagram of the modulator.
FIG. 6 is a schematic diagram of the following amplifier.
FIG. 7 is a schematic diagram of the multiplexer.
FIG. 8 is a schematic diagram of the wideband amplifier.
FIG. 9 is a schematic diagram of the post-filter amplifier.
FIG. 10 is a schematic diagram of the detector.
FIG. 11 is a schematic diagram of the cross-modulation minimization circuit.

In FIG. 1 there is shown a multiplexed seismic data communication system embodying the principles of the invention. A plurality of seismic receivers are dispersed generally in an area remote from a central data collection unit. Only one of these seismic receivers 10 is shown expressly in the FIGURE. A transmission line 12 is provided to electrically couple the outputs of the seismic receivers to that portion of the apparatus located in the central data collection unit. Transmission line 12 may typically be implemented with a conventional coaxial cable. Associated with seismic receiver 10 is an oscillator 14 which provides the carrier signal for use in modulator 16. The amplitude level of the output of seismic receiver 10 is increased by preamplifier 18 and is provided on line 20 as the modulating signal for modulator 16. Various forms of modulation may be used in the practice of the invention including amplitude and angle modulation. Here the term "angle modulation" is intended to cover both frequency and phase modulation. While various forms of modulation may be employed it is preferred that the amplified seismic receiver output signal appearing on line 20 be used to amplitude modulate the carrier signal provided by oscillator 14. The differential output of modulator 16 is converted to a single ended output by following amplifier 22, this single ended output being used to drive multiplexer 24. Multiplexer 24 may be a summing amplifier for adding the modulated signal to other modulated signals already on the cable. Each summing amplifier can be a conventional low noise broadband amplifier with input and output matched to the characteristic impedance of the coaxial cable. Alternatively, multiplexer 24 may be a current summer comprising a current source having a very high output impedance. In this case coaxial cable 12 will be terminated at one end thereof by impedance 28 and at the other end by the input impedance of wideband amplifier 26. Both of these impedances are selected to be equal to the characteristic impedance $Z_0$ of the coaxial cable. Under these conditions it will be recognized by those skilled in the art that the impedance seen at any tap along the length of coaxial cable 12 will be independent of the location of the tap and will be equal to one half the characteristic impedance of the cable. For example, the impedance seen at the point where line 30 taps into coaxial cable 12 is $Z_0/2$. As noted previously, the output impedance of the current summer is high and will be much greater than $Z_0/2$. As a result, the current signal developed in the current summer is coupled by line 30 onto coaxial cable 12.

Oscillator 14, preamplifier 18, modulator 16, following amplifier 22 and multiplexer 24 are duplicated at each of the other seismic receiver locations and function in a similar manner to inject amplitude modulated signals onto the coaxial cable as indicated symbolically at lines 32 and 34. Each oscillator 14, however, is adapted to provide a carrier signal having a frequency distinct from the frequency generated by any other oscillator 14. As a result, there appears on coaxial cable 12 a plurality of amplitude modulated signals each having a carrier frequency distinct from that of any of the other amplitude modulated signals. The system components described to this point, therefore, provide a plurality of amplitude modulated signals each representative of the output of one of the seismic receivers and further provide for frequency division multiplexing of the various amplitude modulated signals onto coaxial cable 12.

While the frequencies generated by the various oscillators 14 are required to be distinct, it is preferred that all these frequencies lie within a single octave Satisfaction of this requirement eliminates the possibility that harmonics generated by a lower frequency oscillator will fall at the fundamental frequency of a higher frequency oscillator. It is also preferred that the carrier frequencies be as high as possible to facilitate subsequent carrier separation at the central data collection unit. On the other hand, ease of transmission and ease of analog circuit design dictate the use of low carrier frequencies. The use of the octave from 300 kHz to 600 kHz has been found to be a suitable compromise between these conflicting requirements.

The system diagram of FIG. 1 is divided generally into two parts by dashed line 36, those elements appearing to the left of the line being located in the vicinity of the seismic receivers while those elements appearing to the right of the line are located at the central data collection unit. The frequency division multiplexed signal appearing on coaxial cable 12 is coupled directly into wideband amplifier 26 at the data collection unit. The bandwidth of this amplifier must be sufficiently broad to accomodate all the carrier frequencies appearing on the cable.

The output of wideband amplifier 26 is coupled by lines 38 and 40 to a plurality of buffers, including buffers 42, 44 and 46. There is a buffer corresponding to each seismic receiver coupled to coaxial cable 12 and each buffer is followed by a group of sub assemblies identical to that group shown expressly following buffer 44. The output of buffer 44, which it will be recalled is an amplified frequency division multiplexed signal, is demultiplexed in filter 48. Filter 48 is a very narrow bandpass filter with a center frequency equal to the carrier frequency utilized at one of the seismic receivers. The bandpass of filter 48 is sufficiently narrow that the filter passes only the carrier frequency and sidebands associated with that particular seismic receiver. Other filters, such as those following buffers 42 and 46 will be tuned to the carrier frequencies associated with others of the seismic receivers. The output of filter 48, comprising a single amplitude modulated signal representing the output of one of the seismic receivers, is demodulated in detector 50. The output of detector 50, which comprises a faithful replica of the analog signal produced by one of the seismic receivers, is further amplified in output amplifier 52. Thus, the subsystem beginning with the plurality of buffers such as buffers 42, 44 and 46 and extending through the plurality of output amplifiers such as amplifier 52 comprises a means for demultiplexing and demodulating the frequency division multiplexed amplitude modulated signals appearing on the coaxial cable. There is available at the output of each of the plurality of output amplifiers an analog signal representative of the output of one of the seismic receivers. These signals are available for immediate processing or to be recorded and preserved for subsequent processing.

The function performed by the remaining elements of FIG. 1 may be illustrated with reference to the amplifier transfer function of FIG. 2. In the ideal case, wideband amplifier 26 of FIG. 1 will have a linear transfer function. In other words, the instantaneous output voltage of the amplifier will be directly proportional to the instantaneous input voltage and the constant of proportionality or amplifier gain will be invariant irrespective of the amplitude of the input voltage. In practice, however, amplifiers having perfectly linear transfer functions are not realized. A typical transfer function is that represented by curve 60 of FIG. 2. In FIG. 2, values along the $x$ axis are considered to be values of the input voltage while those along the $y$ axis are considered to be values of the amplifier output voltage. As is well known in the art if the amplifier is biased at an input voltage X as shown in the FIGURE and if the input voltage to the amplifier is $e_{in}(t)$ as shown, the transfer function curve may be used to graphically construct the waveform of the output voltage $e_{out}(t)$.

The input and output voltages of the amplifier may also be related by an analytical procedure which is better adapted to illustrate the advantages of the present invention. Over some small region of the amplifier transfer function 60, the transfer function may be represented by the following power series in the independent variable $e_{in}(t)$.

$$e_{out}(t) = A_0(X) + A_1(X)e_{in}(t) + A_2(X)e_{in}^2(t) + A_3(X)e_{in}^3(t) + \ldots + A_n(X)e_{in}^n(t)$$

The range of input voltages over which this power series is valid is centered about the bias voltage X. Since the characteristics of curve 60 vary as the bias voltage X is varied, it is clear that the coefficients of the power series $A_i(X)$ are functions of the bias voltage or operating point.

It is of particular importance in the present context to consider the effect of the third order term in the power series. It will be assumed that the input voltage $e_{in}(t)$ is comprised of signals at three distinct frequencies. The first frequency $f_1$ is a first carrier frequency and may typically have a value of 300 kHz. The second signal at frequency $f_2$ is a sideband of this first carrier frequency resulting from amplitude modulation of the carrier signal. If the modulation frequency is 300 Hz then a sideband frequency $f_2$ will be 299.7 kHz. The third signal component having a frequency $f_3$ may be thought of as an unmodulated second carrier signal. For purposes of the illustration, $f_3$ will be assumed to be 400 kHz. If this three component input voltage is cubed in accordance with the third order term of the power series, it will be found that the output voltage will contain a component at a frequency of 399.7kHz. The 300 hertz modulating signal, which in the input voltage had been used to modulate the 300 kHz carrier frequency, has been transferred to the 400 kHz carrier frequency. This transfer of modulating signals between carrier signals is referred to as cross-modulation. In an amplifier such as wideband amplifier 26 of FIG. 1, cross-modulation is highly undesirable since the signal appearing on coaxial cable 12 comprises a plurality of amplitude modulated carrier signals. It should be emphasized that this phenomenon stems from the existence of third and higher order terms in the power series expression (1).

It is thus apparent that the transfer function of wideband amplifier 26 should not have any terms larger than the second order term. It is known that a field effect transistor (FET) produces less cross-modulation than do tubes or transistors. This is due to the fact that FET's are theoretically perfect square law devices. For this reason, as will be seen in FIG. 8, the active element in wideband amplifier 26 has been chosen to be an FET. It is well known, however, that practical FET's are not perfect square law devices. As a result, crossmodulation is observed even with an FET and is found to be a strong function of the bias point. There exists a bias voltage at which cross-modulation distortion is essentially eliminated. If the FET is biased to one side of this bias point and an undesired sideband on a carrier is observed, it will be seen that as the bias voltage is adjusted through the point of minimum cross-modulation distortion the undesired sideband on the carrier will undergo a 180° phase shift. This can be explained if the curve of the transfer function is considered monotonic and only third and lower order terms in the power series are considered. This means that if there is a value of a bias voltage X at which $A_3(X)$ goes to zero, then the value of this coefficient must necessarily change sign as it passes through the point.

The elements of FIG. 1 not yet discussed comprise a feedback loop for continuously monitoring the cross-modulation phase and amplitude. This information is used to generate a feedback signal for adjusting the bias point of amplifier 26 for minimum cross-modulation. Oscillator 62 provides a low frequency modulating signal. The frequency of this modulating signal is chosen to be outside the bandwidth of the signals provided by the various seismic receivers. In a typical case, where the seismic receiver output signals do not contain energy beyond 300 hertz, a frequency of 500 hertz is suitable in oscillator 62. The 500 hertz signal is used to amplitude modulate a carrier signal and the resultant modulated signal is multiplexed into coaxial cable 12. This process of modulating and multiplexing is illustrated by block 64 and may be performed by elements identical to those shown in greater detail with respect to seismic receiver 10. The carrier frequency employed in block 64 is chosen to be distinct from that used in connection with any of the seismic receivers and in the present case may typically have a value of 600 kHz. Thus, in addition to the plurality of modulated signals corresponding to the seismic receiver outputs, the input of wideband amplifier 26 will also include a 600 kHz carrier signal along with its sidebands at 599.5 and 600.5 kHz.

At this point, attention is directed to one of the amplitude modulated signals representing a seismic receiver output. Let the carrier frequency of this signal be denoted by $f_n$. This carrier signal will in general be accompanied by sidebands but they will be restricted to a frequency range of 300 hertz on either side of $f_n$. In particular, there will be no sidebands separated from $f_n$ by 500 hertz. The output of wideband amplifier 26 is coupled by means of lines 38 and 72 to buffer 66 and from there to filter 68. Filter 68 is a very narrowband filter with its frequency response centered at $f_n$. It suppresses all signals other than the carrier signal at frequency $f_n$ and its sidebands. This carrier at $f_n$ is demodulated in detector 70 so as to recover the modulating signals impressed thereon.

If the bias point of wideband amplifier 26 is such as to cause cross-modulation in the amplifier, then the 500 hertz modulating signal impressed on the 600 kHz carrier signal will be transferred to the carrier signal at frequency $f_n$. Under these circumstances the output of detector 70 will include a 500 hertz component as well as lower frequency components corresponding to the output of one of the seismic receivers.

Bandpass filter 74 has a response peaked at 500 hertz and rejects all frequency components below 300 hertz. Accordingly, the existence of a 500 hertz component in the output of this filter is indicative of cross-modulation distortion occurring in wideband amplifier 26. The output of filter 74 provides one input to synchronous rectifier 76. The 500 hertz output of oscillator 62, after passing through 90° phase shifter 78, provides the second input to synchronous rectifier 76. As is well known in the art, the output of synchronous rectifier 76 will have a DC component, the sign of which is determined by the relative phases of the signals appearing on lines 80 and 82. The output of synchronous rectifier 76, after smoothing in integrator-amplifier 84, is coupled by means of line 86 to adjust the bias point of wideband amplifier 26. The polarity of the signal appearing on line 86 is such as to drive the bias of the amplifier toward the point of minimum cross-modulation distortion. It will be understood, therefore, that there has been provided a system for automatically controlling the bias point of amplifier 26 to maintain operation at the correct point for minimum cross-modulation between data channels.

Whereas the invention has been described up to this point in terms of the block diagram of FIG. 1, a detailed description of the various circuit functions appearing in FIG. 1 will next be presented.

FIG. 3

A schematic diagram of oscillator 14 is shown in FIG. 3. It consists of a conventional astable multivibrator but having one of the coupling capacitors replaced by crystal 108. Since the collector of transistor 112 is effectively coupled to the base of transistor 114 only at the resonant frequency of crystal 108 it follows that the multivibrator is constrained to operate at the crystal resonant frequency. The use of crystals having slightly different resonant frequencies at each of the seismic receivers permits the generation of stable and distinct carrier frequencies. A similar circuit may also be used to generate the carrier frequency in modulator and multiplexer 64 of FIG. 1.

FIG. 4

Input amplifier 18 of FIG. 1 is the specially designed high input impedance, low noise circuit shown in FIG. 4. High imput impedance is achieved by the use of differential input stage consisting of transistors 150 and 151 and by the use of negative feedback into one of the inputs of the input stage. The negative feedback is provided by the resistive network comprising resistors 137 and 142. Low noise is achieved through the use of low noise input transistors and proper biasing for optimum noise figure. The differential output of the input stage is coupled to a second differential amplifier stage comprising transistors 152 and 153. The output of the second amplifier stage is coupled through an emitter follower into a final gain stage comprising transistor 156. In the embodiment here illustrated the elements have the following values. Resistors 130 through 134 511K, resistors 136 and 137, 1K, potentiometer 140, 500 Ohms, resistor 142, 100K, resistor 144, 1.62M, resistor 146, 10K, and resistor 148, 3.3K. Transistors 150 through 154 are Fairchild model SE 4022, while transistor 156 is a 2N4060.

FIG. 5

Modulator 16 of FIG. 1 and illustrated in FIG. 5 is a switching type as opposed to a linear multiplier type of modulator. The linear multiplier type is inherently more complex and, more importantly, noise on the carrier adds directly as output noise in the data channel. The switching type multiplier can be used in the present case since harmonics of even the lowest carrier frequency occur outside the aforementioned one octave band used for carrier frequencies. In the embodiment shown transistors 160 and 162 operate as current sources for the emitters of transistors 164 and 166 respectively. Transistors 164 and 166 comprise a differential amplifier with transistors 168, 170, 172 and 174 switching their collector loads at the carrier frequency. Collector load resistors 176 and 178 are chosen to be 10K as a compromise between power consumption and switching speed. Also, it is desirable to keep the output impedance presented to the following stage as low as possible. The gain of the differential amplifier is set by the ratio of two times the collector load resistance divided by the emitter coupling resistance 180. The use of two current sources coupled by a single resistor is the equivalent of a single current source with two resistors.

If there is no DC voltage difference between the bases of transistors 164 and 166, the output will have a suppressed carrier. If this DC voltage difference is made equal to the maximum peak signal, $V_s$ max, then the carrier will have 100% modulation. This means that for 100% modulation, the base of transistor 166 should be biased about one diode drop above the voltage at the base of transistor 162 and the base of transistor 164 should be biased an amount equal to $V_s$ max above the voltage at the base of transistor 166. Now, with unity gain (resistor 180=20K), the collector loads should be biased to a point at least $V_s$ max below the positive supply voltage, +18 volts. This in turn requires that the bases of transistors 168, 170, 172 and 174 not be greater than +18 volts minus $2V_d$ where $V_d$ is a diode voltage drop. Letting $V_s$ max equal 7.5 volts and $V_d$ equal 0.6 volts, then the voltage at the base of transistor 162 must be approximately −17 volts to correctly bias the collector loads. This means that the bases of transistors 168, 170, 172 and 174 can be anywhere from −0.8 to +2.6 volts, nominally +1.7 volts with a carrier peak amplitude as large as 0.9 volt. The bases of transistors 170 and 172 are AC shorted to ground by capacitor 182. Resistors 184 and 186 are used to set the carrier peak amplitude to about 0.15 volt. In FIG. 5 those circuit components included within the dashed lines are provided by a Motorola model MC1596G integrated circuit. The values of other significant circuit components are as follows: Capacitors 182 and 188, 0.1 microfarads, resistor 184, 33K, resistors 176 and 178, 10K, resistor 186, 1K, resistor 180, 20K.

The modulator has a differential output with a large common mode DC voltage. This implies that a differential input to single ended output stage is needed to follow the modulator.

FIG. 6

The following amplifier 22 of FIG. 1 (which is illustrated in FIG. 6) converts the modulator's differential output with a common mode DC voltage to a single ended output with zero DC voltage. The gain of the following amplifier is unity. The amplifier must be able to slew many volts per microsecond since the input signal is an amplitude modulated square wave with a carrier frequency as high as 600 kHz and an output voltage swing of 30 volts peak-to-peak in order to achieve the required signal dynamic range. It should also be a low noise amplifier. Since unity gain is desired, only enough open loop gain for low distortion and low output impedance is required. The differential input stage, consisting of transistors 202 and 204, has a gain of −3.5 db while the following gain stage consisting of transistor 206 has a gain of about 28 db. Since the emitter follower output stage consisting of transistor 208 has approximately unity gain, it will be seen that the overall open loop gain is approximately 24.5 db. High frequency transistors with low feedback capacitances are used in all but the last stage so as to permit the use of low currents while still maintaining the slew rate high. The low currents are conducive to low noise operation. A small capacitor 200 couples the modulator load resistors together so as to compensate for overshoot in the following amplifier.

With the resistance values given in FIG. 6, capacitor 200 and transistors 202, 204, 206 and 208 may be selected from any of the following three combinations.

| | | | |
|---|---|---|---|
| Transistors 202 and 204 | 2N4917 | 2N4917 | MPS 3703 |
| Transistor 206 | 2N4252 | MPS 6545 | MPS 6545 |
| Transistor 208 | 2N3707 | 2N3707 | 2N3707 |
| Capacitor 200 | 2.5pf | 3.3pf | 6pf |

FIG. 7

In a properly terminated transmission line the impedance seen looking into the line at any point along its length is constant and indpendent of the point where it is measured. In the present case, for example, if current summers are used for multiplexing, coaxial cable 12 is terminated at both ends in its characteristic impedance $Z_0$. If the characteristic impedance of the coaxial cable is 75 ohms, then resistor 28 of FIG. 1 as well as the input impedance to wideband amplifier 26 should be 75 ohms. In this case the impedance seen looking into the cable at any point such as where line 30 taps into the cable is 37.5 ohms.

Multiplexer 24 of FIG. 1 may comprise a current summer shown schematically in FIG. 7. Amplitude modulated carrier signals from the modulator following amplifier are input to transistors 220 and 222 which form a complementary current drive to the coaxial cable. The use of complementary transistors allows the circuit to operate with zero DC voltage at the output so that the cable does not have to be biased away from ground as would be the case if a single transistor were used. The complementary current summer can be AC coupled to the cable if desired. Variable resistor 224 provides simultaneous adjustment of the proper bias current for both transistors 220 and 222. Diodes 226 and 228 in the emitters of transistors 220 and 222, respectively, prevent current from flowing due to the low breakdown voltage of the base emitter junctions. These junctions are subjected to a reverse voltage of approximately 15 volts in the complementary configuration. Resistors 230 and 232 set the proper summation current for equal summation gain for all channels.

The following component values are utilized in the current summer. Resistors 230 and 232, 1.8K, variable resistor 224, 1 meg, diodes 226 and 228, Texas Instruments 1N914, transistor 220, Motorola MM4000, transistor 222, Motorola MM3000.

The use of current summation to effect frequency division multiplexing onto the coaxial cable is advantageous in several respects. First, all channels are multiplexed in parallel so that the failure of one current summer effects only its associated channel and has no effect on the data quality of the remaining channels. Also, the current summer is completely independent of position along the cable or of channel frequency. As a result, the current summer units are completely interchangeable. Finally, data from the more remote seismic receivers is not required to flow through a long sequence of active amplifiers for multiplexing. As a result, data quality in terms of linearity, distortion, crosstalk and cross-modulation is improved.

While the transmission line itself is shown only in schematic fashion in FIG. 1, it will be recognized that the transmission line will be located within a protective enclosure as is well known in the art. Other than a reduction in size made possible by replacing a plurality of twisted pairs with a single transmission line it is not contemplated that the mechanical structure of the cables utilized in the practice of the invention will differ materially from previously known structures.

It should also be noted that while only a single coaxial cable is illustrated in FIG. 1, it may be desirable in some cases to locate a plurality of such coaxial cables within a single cable housing. The reason for this is that practical circumstances will dictate a maximum number of channels which can be frequency division multiplexed onto a single transmission line. In the present example wherein all of the amplitude modulated carriers must fit within a 300 kHz bandwidth, achievable responses for filters 48 suggest that the maximum number of channels which can be multiplexed onto a single line is approximately 60. If the contemplated system required 300 seismic receivers it would be possible to utilize five such coaxial cables with their associated circuitry. The five cables could be colocated within a single cable housing if desired.

FIG. 8

Wideband amplifier 26 is illustrated schematically in FIG. 8. Input auto transformer 240 is used to match the input impedance of the common gate field effect transistor 242 (approximately 330 ohms) to the coaxial cable. The tap location is experimentally located to provide the correct terminating impedance for the cable. In order to prevent nonlinearities, the transformer is constructed without magnetic material. It is randomly wound to reduce the distributed capacitance and thus raise its resonant frequency. Litz wire is used to reduce losses. The inductance of the total winding is .3mH and self resonance is at 3mHz. The common gate configuration is used because the voltage step up due to matching requirements is less than with the common source configuration and cross-modulation varies directly with the magnitude of the voltage appearing at the device terminals. The gain of this stage is $g_m R_1$ exclusive of the transformer gain. Field effect transistor 242 is a Texas Instruments 2N3823. A large supply voltage is used to provide as large a linear operating region as possible. With this supply voltage it will be desirable to heat sink the transistor.

The wideband amplifier may drive up to 60 buffers, such as buffers 42, 44 and 46 of FIG. 1. Each of these buffers comprises a conventional source follower stage configured to present a 1,000 ohm source impedance to each of the following narrowband filters.

Each of the narrowband filters, such as filter 48 of FIG. 1 is a sharply tuned crystal bandpass filter. There will be a filter corresponding to each of the seismic receivers and each filter is tuned to the carrier frequency used in association with the corresponding seismic receiver. The bandpass of each of the filters must be sufficiently sharp to adequately resolve the corresponding carrier frequency and its sidebands. It is common practice to specify such crystal filters in terms of the required center frequency, the desired form factor and the desired input and output impedances. Various commercial suppliers, such as McCoy, Motorola, and Bulova will provide crystal filters conforming to such specifications.

FIG. 9

While not shown expressly in FIG. 1 it may be desirable that each filter, such as filter 48, drive an amplifier stage to provide sufficient signal level for the detector stage. The amplifier should have a flat response over the carrier frequency range but should have low gain at low frequencies. This is because the 1/f noise of the amplifier would appear as noise on the envelope of the carrier and appear on the detector output. A suitable amplifier is illustrated in FIG. 9. The input stage comprising transistors 254 and 256 is a differential amplifier with about 46db of gain. The next stage comprising transistors 258 and 260 is AC coupled at about 1kHz and has a complementary collector output for speed. The gain of this second stage is about 18db. A feedback network composed of resistors 250 and 252 sets the closed loop gain of the amplifier. In the circuit as shown, transistors 254, 256 and 258 are Texas Instruments model 2N3707 transistors while transistor 260 is a 2N4061. Resistors 250 and 252 have resistances of 1K and 47K respectively. With these values the closed loop gain of the amplifier is approximately 34db while its input impedance is 1K.

FIG. 10

The detector stages such as detector 50 may be implemented by the network shown schematically in FIG. 10. In this network, operational amplifier 278 with the combination diode and resistive feedback comprises a half-wave rectifier. Resistors 270 and 272 each have resistances of 13K so that the zero-to-peak value of the rectified output is equal to one half the peak-to-peak value of the input. Under these circumstances it will also be seen that the input resistance to the rectifier is 13K. This input resistance actually forms the 13K load resistance for the post filter amplifier as shown in FIG. 9. The rectifier is followed by a two stage RC low pass filter comprised of resistors 280 and 282 and capacitors 284 and 286. The low pass filter suppresses carrier frequency components in the rectifier output so that the detector output is a demodulated signal representative of the corresponding seismic receiver output.

The output amplifiers such as amplifier 54 may each comprise a conventional operational amplifier with suitable resistive feedback to provide a desired level of gain. It is also possible that it may be desirable to employ a low pass filter with a three hundred hertz cut off frequency after the output amplifier. A suitable filter would be a conventional active 24db/octave Butterworth low pass filter.

Turning next to the system components employed in cross modulation minimization, it is noted that 500 hertz oscillator 62 may comprise any conventional low frequency oscillator network. For example, either a phase shift oscillator or Wien bridge oscillator will satisfactorily perform this function. The modulator and multiplexer function 64 may be performed by components similar to the previously discussed combination of crystal oscillator 14, modulator 16, following amplifier 22 and multiplexer 24. Ninety degree phase shifter 78 may comprise a simple two stage RC low pass filter. It is well known that such filters have zero phase shift at low frequencies and a 180° phase shift at high frequencies. Proper selection of the resistance and capacitance values of the network so that the phase shift at 500 hertz is 90° is also well known.

Buffer 66, filter 68 and detector 70 are similar to the previously discussed buffer 44, filter 48 and detector 50.

FIG. 11

A detailed circuit diagram of filter 74, synchronous rectifier 76 and amplifier/integrator 84 is given in FIG. 11. Inductor 300 and capacitor 302 are selected to be resonant at 500 hertz. This series resonant circuit along with operational amplifier 304 and its associated feedback network comprise the 500 hertz filter. Synchronous detector 306 is a Motorola model MC1596G integrated circuit. A schematic diagram of this integrated circuit is included in FIG. 5. The differential output of the synchronous detector is converted to a single ended output and integrated simultaneously by operational amplifier 308 and its associated feedback network. The integrator output adjusts the bias point of wideband amplifier 26 via an emitter follower comprised of transistor 310. In the circuit, transistor 310 is a Texas Instruments 2N706 transistor while operational amplifiers 304 and 308 are each one half of a Fairchild model UA739 integrated circuit.

In the preferred embodiment the power source at the central collection unit provides a voltage level of 500 volts RMS at kHz. A common two conductor power line, also included within the cable enclosure, connects this power source to each of the seismic receiver locations. At each seismic receiver location this is converted by a transformer, bridge rectifier and regulator network to plus and minus 18 volts DC.

There has been disclosed a unique method and system for coupling the signals from a plurality of sensors to a central data collecting unit by means of a single transmission line. Included within the invention are a unique method for frequency division multiplexing a plurality of amplitude modulated signals onto the transmission line and a method for minimizing crossmodulation distortion associated with the amplification of the frequency division multiplexed signals. While the invention has been disclosed in the context of a seismic prospecting application it will be noted that the invention may be applied in other related fields. Also, while the invention has been disclosed in terms of a preferred embodiment various other modifications of the disclosed embodiment will become apparent to persons skilled in the art without departing from the spirit and scope of the invention as defined by the appended claims. It is well known for example that transmission lines of the type employed in the present invention are not lossless and that signals experience attenuation as they propagate along the transmission line. In some cases the degree of this signal attenuation in the transmission line may be unacceptable and it may be desirable in the practice of the present invention to include repeater means at one or more points along the transmission line. The repeater means could comprise simply an amplifier similar to wideband amplifier 26 of FIG. 1. In this case it may also be desirable to include with each such amplifier the disclosed network for minimizing cross modulation distortion.

What is claimed is:

1. A cable system for coupling the signals induced at a plurality of sensors to a central collecting unit, said cable system comprising:
    a. a transmission line for providing an output signal at said collecting unit,
    b. termination means on said transmission line such that the impedance seen looking onto the line at any point along its length is approximately constant as a function of location along the line,
    c. means for modulating a carrier signal having a distinct frequency at at least two of said sensors, each modulating signal being an electrical signal representative of the output of a sensor, and
    d. an independent current summer for each modulated carrier signal, wherein each said current summer comprises an amplifier having an output impedance substantially greater than one-half the characteristic impedance of said transmission line, each current summer being responsive to the corresponding modulated carrier signal and adapted to provide on said transmission line a current representative of said corresponding modulated carrier signal whereby the modulated carrier signals are frequency division multiplexed onto said transmission line.

2. The cable system of claim 1 wherein said sensors are seismic receivers.

3. The cable system of claim 1 wherein said termination means comprises impedances located at each end of said transmission line, each of said impedances being matched to the characteristic impedance of said transmission line.

4. The cable system of claim 1 wherein each said current summer comprises a solid state amplifier.

5. The cable system of claim 1 wherein said sensors are seismic receivers.

6. A cable system comprising:
    a. a transmission line extending from a central data collecting unit to a plurality of sensors,
    b. means at each said sensor for modulating a carrier signal having a distinct frequency with a signal representative of the output of said sensor,
    c. means for frequency division multiplexing the modulated signals onto said transmission line,
    d. a broadband amplifier for amplifying the frequency division multiplexed signal appearing on said transmission line, and
    e. closed loop stabilizing means for minimizing crossmodulation in said broadband amplifier.

7. The cable system of claim 6 wherein said broadband amplifier is located at said central data collecting unit.

8. The cable system of claim 6 wherein said stabilizing means comprises a feedback loop for adjusting the bias point of said broadband amplifier in response to cross-modulation products appearing in the amplifier output.

9. The cable system of claim 8 comprising at least one additional broadband amplifier located at an intermediate point along said transmission line.

10. The cable system of claim 8 wherein said wideband amplifier includes a field effect transistor.

11. The cable system of claim 8 wherein said means for frequency division multiplexing comprises a current summer for each modulated signal.

12. The cable system of claim 11 wherein each of said sensors is a seismic receiver.

13. The cable system of claim 1 further comprising:
    a. a plurality of narrowband filters, each responsive to the output of said wideband amplifier and each adapted to pass the modulated signal from one of said sensors, and b. a plurality of detectors, each adapted to demodulate the signal appearing at the output of one of said narrowband filters.

14. The cable system of claim 13 further comprising closed loop stabilizing means for minimizing cross-modulation in said wideband amplifier.

15. The cable system of claim 14 wherein each said sensor comprises a seismic receiver.

16. A system for minimizing cross-modulation in an amplifier wherein the input signal to said amplifier includes at least two carrier signals, each at a distinct frequency, said system comprising;
   a. means for adding to the input signal of said amplifier an amplitude modulated local carrier signal,
   b. means for sensing in the output signal of said amplifier, cross-modulation products between said amplitude modulated local carrier signal and one of said at least two carrier signals, and
   c. means responsive to the output of said means for sensing for controlling the transfer function of said amplifier.

17. The system of claim 16 wherein said means for controlling comprises means for adjusting the bias point of said amplifier.

18. In an amplifier having an input signal comprised of a plurality of carrier signals, each at a distinct frequency, a system for minimizing cross-modulation in said amplifier comprising:
   a. first means for adding to the input of said amplifier a local carrier signal, distinct in frequency from at least one of said plurality of carrier signals and amplitude modulated by a local modulating signal,
   b. a filter responsive to the output of said amplifier for passing a narrow band of frequencies centered about the frequency of one of said plurality of carrier signals,
   c. a detector for demodulating the output of said filter,
   d. a second means responsive to signal energy at the frequency of said local modulating signal in the output of said detector for producing a feedback signal to adjust the bias point of said amplifier.

19. The system of claim 18 wherein said second means comprises:
   a. a narrowband filter responsive to the output of said detector with a passband centered at the frequency of said local modulating signal,
   b. a synchronous rectifier responsive to the output of said narrowband filter and to said local modulating signal,
   c. an integrator operatively coupled to the output of said synchronous rectifier for providing a bias signal to a stage of said amplifier whereby the transfer function of said amplifier is adjusted to minimize cross-modulation.

20. A method of coupling the signals from a plurality of sensors to a central collecting unit comprising:
   a. coupling one end of a transmission line to said central collecting unit,
   b. terminating both ends of said transmission line in its own characteristic impedance,
   c. for at least two of said sensors, modulating a carrier signal having a distinct frequency with the output signal of the sensor,
   d. producing current signals each representative of one of the modulated carrier signals, and
   e. summing said current signals onto said transmission line the steps of producing and summing comprise amplifying each modulated carrier signal in an amplifier which has an output impedance substantially greater than the characteristic impedance of said transmission line and connecting the output of each of said amplifiers to said transmission line.

21. The method of claim 20 wherein said sensors comprise seismic receivers.

22. The method of claim 21 further comprising the steps of:
   a. coupling the frequency division multiplexed signal appearing on said transmission line at said central collecting unit to the input of a wideband amplifier, and
   b. automatically adjusting the operating point of said wideband amplifier to minimize cross-modulation by the amplifier.

23. A method for minimizing cross-modulation in an amplifier between two or more of a plurality of modulated carrier signals appearing in the amplifier input, the method comprising the steps of:
   a. adding a local modulated carrier signal to the amplifier input,
   b. detecting cross-modulation products in the amplifier output between said local modulated carrier signal and one of said plurality of modulated carrier signals, and
   c. adjusting the transfer function of said amplifier in accordance with the amplitude and phase of said cross-modulation products.

24. The method of claim 23 wherein the step of detecting comprises the substeps of:
   a. filtering the output of said amplifier to isolate a narrowband of frequencies centered about the carrier frequency of one of said modulated carrier signals,
   b. demodulating the filtered output, and
   c. filtering the demodulated output to isolate a narrowband of frequencies centered about the modulating frequency of said local modulated carrier signal.

25. The method of claim 24 wherein the step of adjusting comprises the substeps of:
   a. comparing in a synchronous detector the filtered demodulated output signal with the modulating signal of said local modulated carrier signal, and
   b. integrating the synchronous detector output signal to produce feedback signal for controlling the operating point of said amplifier.

* * * * *

UNITED STATES PATENT OFFICE
CERTIFICATE OF CORRECTION

Patent No. 3,988,712          Dated October 26, 1976

Inventor(s) G. Dale Ezell - George L. Streckmann

It is certified that error appears in the above-identified patent and that said Letters Patent are hereby corrected as shown below:

Inventor name misspelled - change "Steckmann" to --Streckmann--.

Signed and Sealed this

Fourteenth Day of June 1977

[SEAL]

*Attest:*

RUTH C. MASON
*Attesting Officer*

C. MARSHALL DANN
*Commissioner of Patents and Trademarks*